US010597331B2

(12) United States Patent
Ko

(10) Patent No.: US 10,597,331 B2
(45) Date of Patent: Mar. 24, 2020

(54) LIGHTWEIGHT SOUND-ABSORBING AND FIRE-RESISTANT INSULATION PANEL USING EXPANDED GRAPHITE AND SWELLING CLAY AND METHOD FOR MANUFACTURING THE SAME

(71) Applicant: Young Shin Ko, Seongnam-si (KR)

(72) Inventor: Young Shin Ko, Seongnam-si (KR)

( * ) Notice: Subject to any disclaimer, the term of this patent is extended or adjusted under 35 U.S.C. 154(b) by 487 days.

(21) Appl. No.: 15/322,872

(22) PCT Filed: Dec. 24, 2015

(86) PCT No.: PCT/KR2015/014256
§ 371 (c)(1),
(2) Date: Dec. 29, 2016

(87) PCT Pub. No.: WO2016/105159
PCT Pub. Date: Jun. 30, 2016

(65) Prior Publication Data
US 2017/0152190 A1 Jun. 1, 2017

(30) Foreign Application Priority Data
Dec. 24, 2014 (KR) .................. 10-2014-0189142

(51) Int. Cl.
*C04B 41/53* (2006.01)
*C04B 35/536* (2006.01)
(Continued)

(52) U.S. Cl.
CPC ........ *C04B 35/536* (2013.01); *B29C 45/0013* (2013.01); *C04B 33/04* (2013.01);
(Continued)

(58) Field of Classification Search
CPC ............... C04B 35/536; B29C 45/0013
See application file for complete search history.

(56) References Cited

U.S. PATENT DOCUMENTS 3,953,357 A * 4/1976 Preston .................... B01J 20/10
252/378 R
4,520,068 A * 5/1985 Sommer ................ F16J 15/122
428/324
(Continued)

FOREIGN PATENT DOCUMENTS

JP 2006-045492 A 2/2006
KR 10-2005-0081763 A 8/2005
(Continued)

OTHER PUBLICATIONS

ISR issued in corresponding International application No. PCT/KR2015/014256 dated Apr. 7, 2016.

*Primary Examiner* — Leith S Shafi
*Assistant Examiner* — Nicholas R Krasnow
(74) *Attorney, Agent, or Firm* — Nath, Goldberg & Meyer; Jerald L. Meyer; Stanley N. Protigal

(57) ABSTRACT

The present invention relates to a lightweight sound-absorbing and fire-resistant insulation panel including: a binder; expanded graphite; and swelling clays, and the swelling clays are formed of honeycomb-shaped layered clays containing water molecules in interlayers and have particle sizes in the range of 50 to 200 μm. Further, the expanded graphite is present in an amount of from 10 to 100 parts by weight per 100 parts by weight of the swelling clays. According to the present invention, the insulation panel is made of the expanded graphite and the honeycomb-shaped swelling clays, thus providing excellent lightweightness, sound absorption, insulation, fire resistance and flame retardancy, and further, the insulation panel is manufactured without having any sintering, thus providing simple manufacturing processes and lowering production costs.

18 Claims, 13 Drawing Sheets

(51) Int. Cl.
<table>
<tr><td>E04B 1/94</td><td>(2006.01)</td></tr>
<tr><td>C09K 21/02</td><td>(2006.01)</td></tr>
<tr><td>B29C 45/00</td><td>(2006.01)</td></tr>
<tr><td>C04B 33/04</td><td>(2006.01)</td></tr>
<tr><td>C04B 33/13</td><td>(2006.01)</td></tr>
<tr><td>C04B 35/626</td><td>(2006.01)</td></tr>
<tr><td>C04B 35/634</td><td>(2006.01)</td></tr>
<tr><td>C08K 3/04</td><td>(2006.01)</td></tr>
<tr><td>C08K 3/34</td><td>(2006.01)</td></tr>
<tr><td>C08K 7/24</td><td>(2006.01)</td></tr>
<tr><td>E04C 2/02</td><td>(2006.01)</td></tr>
<tr><td>E04B 1/90</td><td>(2006.01)</td></tr>
<tr><td>B29K 507/04</td><td>(2006.01)</td></tr>
<tr><td>B29K 509/02</td><td>(2006.01)</td></tr>
<tr><td>B29L 31/00</td><td>(2006.01)</td></tr>
</table>

(52) U.S. Cl.
CPC ........ *C04B 33/131* (2013.01); *C04B 33/1305* (2013.01); *C04B 33/1315* (2013.01); *C04B 35/62605* (2013.01); *C04B 35/62675* (2013.01); *C04B 35/63416* (2013.01); *C08K 3/04* (2013.01); *C08K 3/346* (2013.01); *C08K 7/24* (2013.01); *C09K 21/02* (2013.01); *E04B 1/942* (2013.01); *E04C 2/02* (2013.01); *B29K 2507/04* (2013.01); *B29K 2509/02* (2013.01); *B29K 2995/0002* (2013.01); *B29K 2995/0015* (2013.01); *B29K 2995/0016* (2013.01); *B29K 2995/0063* (2013.01); *B29L 2031/776* (2013.01); *C04B 2235/349* (2013.01); *C04B 2235/425* (2013.01); *C04B 2235/48* (2013.01); *C04B 2235/5436* (2013.01); *C04B 2235/656* (2013.01); *C04B 2235/9607* (2013.01); *C08K 2201/005* (2013.01); *E04B 1/90* (2013.01)

(56) References Cited

U.S. PATENT DOCUMENTS

| | | | | |
|---|---|---|---|---|
| 5,607,889 | A * | 3/1997 | Prosdocimi | B01J 21/16 502/80 |
| 6,544,445 | B1 * | 4/2003 | Graf | A62C 3/16 252/606 |
| 2004/0000735 | A1 * | 1/2004 | Gilbert, Sr. | C04B 35/536 264/40.1 |
| 2007/0015267 | A1 * | 1/2007 | Da Silva | C04B 38/0695 435/182 |
| 2009/0295103 | A1 * | 12/2009 | Ebina | B32B 18/00 277/650 |
| 2010/0294454 | A1 * | 11/2010 | Muller | B22C 1/185 164/528 |
| 2012/0091388 | A1 * | 4/2012 | Felisari | C08J 9/0061 252/62 |
| 2012/0270052 | A1 * | 10/2012 | Nehls | B29C 67/205 428/404 |
| 2013/0005896 | A1 * | 1/2013 | Jain | C01B 32/225 524/496 |
| 2015/0183023 | A1 * | 7/2015 | Retot | C04B 28/146 164/349 |
| 2016/0208069 | A1 * | 7/2016 | Lee | C08J 9/0066 |
| 2017/0096590 | A1 * | 4/2017 | Geohegan | C09K 5/063 |

FOREIGN PATENT DOCUMENTS

| | | | |
|---|---|---|---|
| KR | 10-0634935 B1 | 10/2006 | |
| KR | 10-2012-0075821 A | 7/2012 | |
| KR | 20120075821 A | 7/2012 | |
| KR | 10-2014-0006146 A | 1/2014 | |
| WO | WO-2013178923 A1 * | 12/2013 | ............. B22C 1/181 |

\* cited by examiner

| Element | Weight% | Atomic% |
|---|---|---|
| C | 89.41 | 92.13 |
| O | 9.86 | 7.63 |
| S | 0.46 | 0.18 |
| Fe | 0.27 | 0.06 |
| Totals | 100.00 | | high frequency band sound absorption coefficient

| Test Item | Result | | | | | Test Method |
|---|---|---|---|---|---|---|
| | Frequency(Hz) | | | | | |
| | 800 | 1000 | 1250 | 1600 | 2000 | |
| Sound Absorption Coefficient | 0.22 | 0.36 | 0.41 | 0.36 | 0.46 | KS F 2814-2:2002 |

| Test Item | Result | | | | Test Method |
|---|---|---|---|---|---|
| | Frequency(Hz) | | | | |
| | 2500 | 3150 | 4000 | 5000 | |
| Sound Absorption Coefficient | 0.37 | 0.35 | 0.45 | 0.40 | KS F 2814-2:2002 |

LIGHTWEIGHT SOUND-ABSORBING AND FIRE-RESISTANT INSULATION PANEL USING EXPANDED GRAPHITE AND SWELLING CLAY AND METHOD FOR MANUFACTURING THE SAME

This is a National Phase Application filed under 35 U.S.C. 371 as a national stage of PCT/KR2015/014256, filed Dec. 24, 2015, an application claiming the benefit of Korean Application No. 10-2014-0189142, filed Dec. 24, 2014, the content of each of which is hereby incorporated by reference in its entirety.

BACKGROUND OF THE INVENTION

Field of the Invention

The present invention relates to a lightweight sound-absorbing and fire-resistant insulation panel manufactured using expanded graphite and swelling clays and a method for manufacturing the same, and more particularly, to a lightweight sound-absorbing and fire-resistant insulation panel and a method for manufacturing the same that is manufactured using expanded graphite and swelling clays, thus providing excellent lightweightness, sound absorption, insulation, fire resistance and flame retardancy and that is manufactured without having any sintering, thus providing simple manufacturing processes and lowering production costs.

Background of the Related Art

Demands for sound absorption materials and insulation materials have been drastically increased to improve residential environment. Styrofoam used for building insulation materials or sound absorption materials is lightweight and good insulation and sound absorption effects, but it has weak durability and easiness in ignition and flash, so that it generates toxic gas on fire to undesirably cause human injury, thus being recently restricted in use.

Further, glass fiber much used for building insulation materials or sound absorption materials is safe against dangers like fire, but if the glass fiber is exposed to the air, it may be abraded to generate needle-shaped dust harmful to human body. During construction, also, the harmful dust is generated from the glass fiber to undesirably give bad influences on the health of workers, and since it is well known that dust particles generated by the aging of the glass fiber material are harmful to human body, the amount of glass fiber used has been gradually reduced.

Additionally, waste timber used for building insulation materials or sound absorption materials is eco-friendly, but it is weak to fire. Especially, the waste timber has low performance as the sound absorption material or the insulation material, and when the waste timber is needed, further, it is a little hard to gently supply the waste timber.

Also, metal materials like aluminum Al are provided as the sound absorption material or the insulation material, but they are expensive undesirably to raise manufacturing cost and to lower resource saving effects.

Further, cement concrete materials are provided as the sound absorption material or the insulation material, but since they have high specific gravity, the product is heavy.

In case of the cement concrete sound absorption material, accordingly, constructability is bad and sound absorption performance is also low.

SUMMARY OF THE INVENTION

Accordingly, the present invention has been made in view of the above-mentioned problems occurring in the prior art, and it is an object of the present invention to provide a lightweight sound-absorbing and fire-resistant insulation panel and a method for manufacturing the same that is manufactured using expanded graphite and swelling clays, thus providing excellent lightweightness, sound absorption, insulation, fire resistance and flame retardancy and that is manufactured without having any sintering, thus providing simple manufacturing processes and lowering production costs.

To accomplish the above-mentioned object, according to a first aspect of the present invention, there is provided a lightweight sound-absorbing and fire-resistant insulation panel including: a binder; expanded graphite; and swelling clays, wherein the swelling clays could be swollen as much as 20 to 50 times in the distance between the layers and are formed of honeycomb-shaped layered clays containing water molecules in interlayers and have particle sizes in the range of 50 to 200 μm.

According to the present invention, desirably, the expanded graphite is present in an amount of from 10 to 100 parts by weight per 100 parts by weight of the swelling clays.

According to the present invention, desirably, the binder is present in an amount of from 30 to 200 parts by weight per 100 parts by weight of the swelling clays and the expanded graphite.

According to the present invention, desirably, the swelling clays include one or more materials selected from the group consisting of bentonite, vermiculite, montmorillonite, chlorite, sepiolite, attapulgite, saponite, hectorite, beidellite, halloysite, sauconite, and nontronite.

According to the present invention, desirably, the binder includes one or more materials selected from the group consisting of polyvinyl alcohol, polyethylene glycol, and methyl cellulose.

According to the present invention, desirably, the sound-absorbing and fire-resistant insulation panel further includes 10 to 200 parts by weight of a flame-retardant composition per 100 parts by weight of the expanded graphite and the swelling clays, and the flame-retardant composition includes one or more materials selected from the group consisting of water glass removing alkali metal carbonates therefrom and silica sol.

According to the present invention, desirably, the swelling clays are the layered clays having water molecules and exchangeable cations disposed in interlayers.

According to the present invention, desirably, the swelling clays are the layered clays having water molecules disposed in interlayers in such a manner as to be partially exchanged with organic matters to form a clay-organic complex.

According to the present invention, desirably, the sound-absorbing and fire-resistant insulation panel has a thickness of 5 to 50 mm.

According to the present invention, desirably, the thermal conductivity thereof is in the range of 0.1 to 0.3 W/mK.

According to the present invention, desirably, the apparent density thereof is in the range of 0.1 to 0.5 g/cm$^3$.

To accomplish the above-mentioned object, according to a second aspect of the present invention, there is provided a method for manufacturing a lightweight sound-absorbing and fire-resistant insulation panel, the method including the steps of: expanding graphite through acid and thermal treatments to make expanded graphite; crushing clays to a shape of circles, swelling the distance between the layer as much as 20 to 50 times by heating the clays to a temperature of about 400 to 600° C., and expanding the clays to make swelling clays; and mixing the expanded graphite with a binder and the swelling clays, wherein the swelling clays are formed of honeycomb-shaped layered clays containing water molecules in interlayers and have particle sizes in the range of 50 to 200 µm.

According to the present invention, desirably, the expanded graphite is present in an amount of from 10 to 100 parts by weight per 100 parts by weight of the swelling clays, and the binder is present in an amount of from 30 to 200 parts by weight per 100 parts by weight of the swelling clays and the expanded graphite.

According to the present invention, desirably, the binder includes one or more materials selected from the group consisting of polyvinyl alcohol, polyethylene glycol, and methyl cellulose.

According to the present invention, desirably, the thermal conductivity of the sound-absorbing and fire-resistant insulation panel is in the range of 0.1 to 0.3 W/mK.

According to the present invention, desirably, the apparent density of the sound-absorbing and fire-resistant insulation panel is in the range of 0.1 to 0.5 g/cm$^3$.

According to the present invention, desirably, the method further includes the step of mixing 10 to 200 parts by weight of a flame-retardant composition per 100 parts by weight of the expanded graphite and the swelling clays, and the flame-retardant composition including one or more materials selected from the group consisting of water glass removing alkali metal carbonates therefrom and silica sol.

According to the present invention, desirably, the method further includes the step of mixing 10 to 100 parts by weight of one or more materials selected from the group consisting of water and ethanol per 100 parts by weight of the expanded graphite and the swelling clays.

According to the present invention, desirably, the swelling clays are the layered clays having water molecules and exchangeable cations disposed in interlayers.

According to the present invention, desirably, the swelling clays are the layered clays having water molecules disposed in interlayers in such a manner as to be partially exchanged with organic matters to form a clay-organic complex.

According to the present invention, desirably, the swelling clays include one or more materials selected from the group consisting of bentonite, vermiculite, montmorillonite, chlorite, sepiolite, attapulgite, saponite, hectorite, beidellite, halloysite, sauconite, and nontronite.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENTS

Figure 1A:
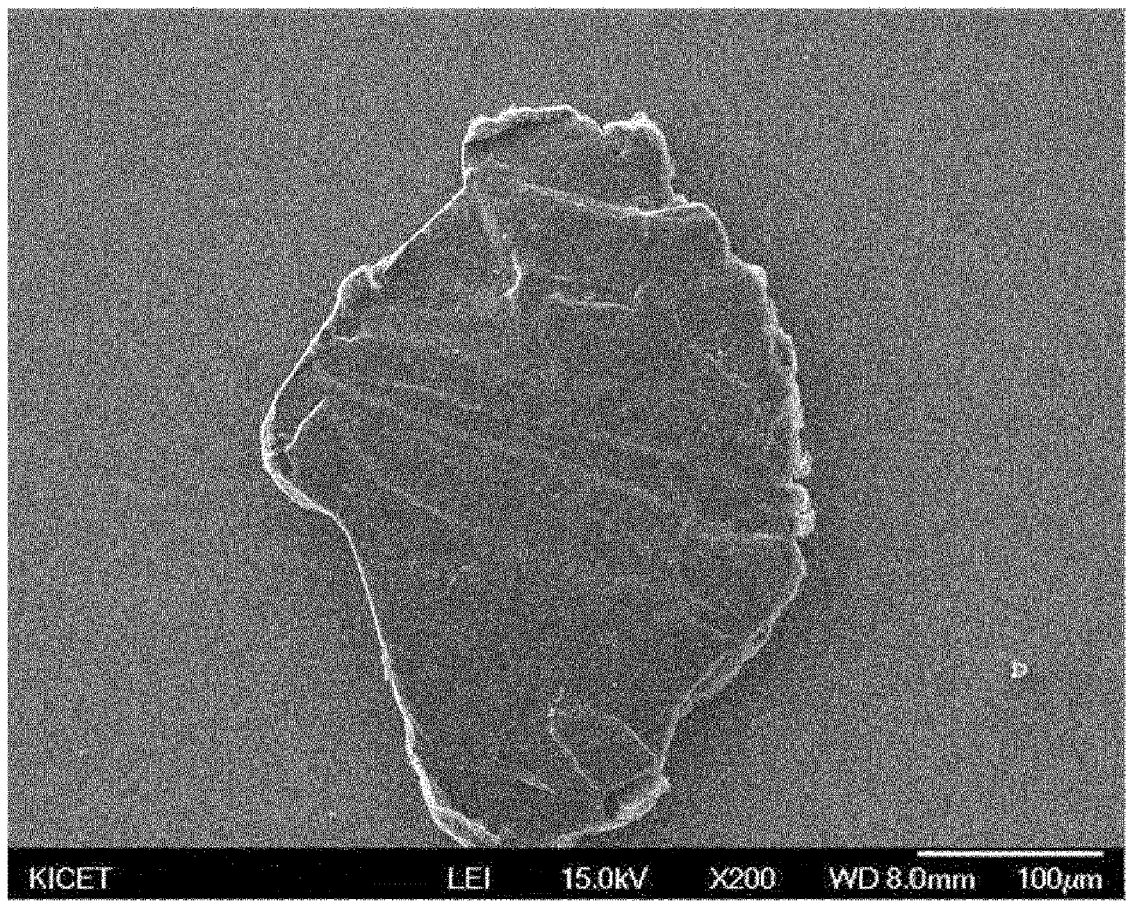
FIGS. 1a to 1c are photographs taken by a scanning electron microscope SEM showing expanded graphite before a thermal treatment in a lightweight sound-absorbing and fire-resistant insulation panel according to a first embodiment of the present invention.

Hereinafter, an explanation on a lightweight sound-absorbing and fire-resistant insulation panel according to the present invention will be in detail given with reference to the attached drawing.

However, specific exemplary embodiments of the present invention do not limit the invention within specific embodiments and it should be understood that the invention covers all the modifications, equivalents, and replacements within the idea and technical scope of the invention.

Conventional sound-absorbing or heat-insulating panels have at least one or more defects, such as heavy weights, weakness to fire, serious harms on human body, and bad sound-absorbing effects, but so as to solve the above-mentioned problems, the present invention provides an insulation panel having excellent lightweightness, sound absorption and thermal insulation properties.

So as to improve the lightweight, thermal insulation and sound absorption of the insulation panel, main materials of the insulation panel according to the present invention are expanded graphite and swelling clays.

According to a preferred embodiment of the present invention, a lightweight sound-absorbing and fire-resistant insulation panel includes: a binder having one or more materials selected from the group consisting of polyvinyl alcohol, polyethylene glycol, and methyl cellulose; expanded graphite; and swelling clays, wherein the expanded graphite is present in an amount of from 10 to 100 parts by weight per 100 parts by weight of the swelling clays, the binder is present in an amount of from 30 to 200 parts by weight per 100 parts by weight of the swelling clays and the thermally treated expanded graphite, and the sound-absorbing and fire-resistant insulation panel has a thickness of 5 to 50 mm.

The swelling clays have a honeycomb-shaped layered structure with swelling the distance between the layer by heating the clays at a temperature of about 400 to 600° C. and have particle sizes in the range of 50 to 200 µm.

According to the present invention, the expandable graphite is first cleaned with water and then subjected to a sulfuric acid treatment, thus performing first expansion, next, the expanded graphite is cleaned with purified water and heat is then applied to the graphite, thus performing second expansion, so that the initial graphite is expanded tens to hundreds of times through the sulfuric acid and thermal treatments, which is called expanded graphite.

In a general method of manufacturing graphite, the extracted graphite from a natural mine would be crushed and supplied with water.

The first expansion process to make the graphite as expandable graphite is performed using strong acid like sulfuric acid.

And then, the second expansion to make expanded graphite is performed by sintering the expandable graphite at a high temperature and in an alkali state, cleaning the sintered graphite to produce the graphite with a purity of 99.5%, and expanding the cleaned graphite through preheating.

The expanded graphite is a flame retardant material, and in this case, the expanded carbon layers act as insulation layers to prevent the movements of heat. The expanded graphite may be applied as a non halogen type low smoke density eco-friendly flame retardant material.

If the expanded graphite is expanded through thermal treatment, it has excellent insulation properties in the vertical direction with respect to the surface forming the layer.

Advantageously, the expanded graphite has no toxicity and halogens, is lightweight and soluble in water, and does not generate poisonous gas.

On the other hand, the swelling clays serve to apply plasticity to clay bodies during molding to maintain sufficient molding strength. The addition of the swelling clays enables the plasticity to be improved and further allows the insulation panel manufactured to be lightweight.

The swelling clays have layered clays having minute particles in which clay crystals are maintained by weak van der Waals forces. The swelling clays generally absorb water well thereto and form pores when contracted through the evaporation of the water absorbed thereto.

The swelling clays are manufactured by crushing clays to a shape of circles, swelling the distance between the layer as much as 20 times to 50 times by heating the clays to a temperature of about 400 to 600° C. to expand the clays, and crushing the expanded clays to particle sizes in the range of 50 to 200 µm. The swelling clays after the crushing, heating, expansion and crushing processes have the layered structure with the shape of honeycombs. As the swelling clays expanded through the absorption of water, layered clays are provided wherein water molecules are disposed in interlayers, layered clays are provided wherein water molecules and exchangeable cations (generally, Na+, Li+, etc. as alkali ions) are disposed in interlayers, and layered clays are provided wherein water molecules disposed in interlayers are partially exchanged with organic matters to form a clay-organic complex. If the swelling clays have the honeycomb-shaped layered structure, the insulation panel can improve the capability of absorbing sounds through the honeycombs formed on the respective layers.

According to the swelling clays having the water molecules and the exchangeable cations disposed in the interlayers, basically, the water molecules coordinate the exchangeable cations, and hydrogen bonds are regularly arranged between the water molecules and between the water molecules and the bottom surface oxygen. On the other hand, an amount of interlayer water, that is, the number of water molecules is step by step changed in accordance with surrounding humidity and the kinds of exchangeable cations disposed in interlayers, and accordingly, the interlayer distance is accordingly changed. The swelling clays having the exchangeable cations have surface replacement reactions with inorganic cluster cations having different cations in interlayers or colloid particles having cationic surface charge, according to its inherent cation exchange properties, thus forming so-called cross linked clays. The cross linked clays have inorganic oxides existing in interlayers in such a manner as to serve as cross-links, thus forming stable pores therein.

According to the swelling clays having the water molecules disposed in interlayers in such a manner as to be partially exchanged with the organic matters to form the clay-organic complex, the water molecules have ion exchange reactions with the exchangeable cations and organic cations disposed in interlayers, or the water molecules absorb polar organic molecules thereto, thus mixing the organic matters in interlayers. For example, neutral molecules like ethylene glycol and glycerol or organic cations like alkyl ammonium are mixed in interlayers.

The swelling clays include one or more materials selected from the group consisting of bentonite, vermiculite, montmorillonite, chlorite, sepiolite, attapulgite, saponite, hectorite, beidellite, halloysite, sauconite, and nontronite.

Among them, the bentonite has a strong bonding force, good swelling properties, and high cation exchangeability.

Among them, the montmorillonite has special swelling properties through hydration reaction of interlayer ions in a water solution. The montmorillonite has high cation exchangeability so that lattice exfoliation occurs easily by means of swelling in the water solution. In case of montmorillonite having Na+ or Li+ as the exchangeable cations, an interlayer distance between 40 to 140 Å under water is measured, and accordingly, the clays absorb water to the interlayers under water and are thus swollen.

Among them, the halloysite has the water molecules disposed in the interlayers in the state of being wet, but does not contain exchangeable cations. If the interlayer water of the halloysite is dried, it may be easily dewatered, and the interlayer distance is reduced to the range of from 10 to 7.4-7.5 Å.

The swelling clays serve to provide good plasticity and lightweightness and further serve as a water barrier material (or water-proofing material) to prevent water from passing through the insulation panel according to the present invention.

The sound-absorbing and fire-resistant insulation panel as mentioned above has thermal conductivity in the range of 0.1 to 0.3 W/mK.

The sound-absorbing and fire-resistant insulation panel as mentioned above has apparent density in the range of 0.1 to 0.5 g/cm$^3$.

The thermal conductivity is a value measured at 25° C. If the thermal conductivity of the sound-absorbing and fire-resistant insulation panel is less than 0.1 W/mK, the insulation properties are improved, but the sound absorption properties are lowered. If the thermal conductivity thereof is greater than 0.3 W/mK, contrarily, the insulation properties get bad.

Further, the apparent density is in the range of 0.1 to 0.5 g/cm$^3$ in consideration of optimal sound absorption and insulation properties, which is measured according to the method prescribed in KS M 6962. If the apparent density is less than 0.1 g/cm$^3$, it can be checked that the sound absorption properties are drastically bad due to excessive lightweightness, and contrarily, if the apparent density is greater than 0.5 g/cm$^3$, it can be checked that the sound absorption properties are improved but the weight of the insulation panel gets heavy.

According to the present invention, further, the lightweight sound-absorbing and fire-resistant insulation panel includes one or more materials selected from the group consisting of polyvinyl alcohol, polyethylene glycol, and methyl cellulose. One or more materials selected from the group consisting of polyvinyl alcohol, polyethylene glycol, and methyl cellulose constitute a binder which applies adhesion force to the space between the expanded graphite and the swelling clay particles, maintains the strength of the insulation panel upon molding to improve the constructability thereof, and also increases the elasticity of the insulation panel. The binder having the one or more materials selected from the group consisting of polyvinyl alcohol, polyethylene glycol, and methyl cellulose is present in an amount of from 30 to 200 parts by weight per 100 parts by weight of the swelling clays and the thermally treated expanded graphite.

According to the present invention, further, the lightweight sound-absorbing and fire-resistant insulation panel includes any of glass components of water glass removing alkali metal carbonates like Na therefrom and silica sol so as to improve flame retardancy properties. There are various methods for making water glass from which alkali metal carbonates like Na are removed. For example, $SiO_2$ and $Na_2CO_3$ are mixed and melted with each other and then quenched to produce water glass. After that, the water glass is absorbed to resin to remove the alkali metal carbonates (e.g., Na). The silica sol means the particles in the state of colloid wherein water or ethanol as a dispersion medium is added to the water glass to increase liquidity by dispersion of the particle of silicic acid ($SiO2$, $nH2O$) to dispersion medium.

If any of the glass components of the water glass from which the alkali metal carbonates are removed and the silica sol increasing the liquidity of particles is additionally contained, the flame retardancy of the expanded graphite can be improved, thus providing good flame retardancy properties for the insulation panel. Any of the glass components of the water glass from which the alkali metal carbonates are removed and the silica sol is present in an amount of from 10 to 200 parts by weight per 100 parts by weight of the swelling clays.

Now, an explanation on a method for manufacturing the lightweight sound-absorbing and fire-resistant insulation panel according to the present invention will be in detail given.

The expanded graphite is inserted into a furnace like an electric furnace and then subjected to thermal treatment. An expansion starting temperature of the expanded graphite is determined by the chemicals (for example, sulfur compounds, nitrogen compounds and the like), and desirably, the thermal treatment is conducted at a low temperature in the range of 500 to 900° C. for 10 seconds to 12 hours. During the thermal treatment, desirably, the internal pressure of the furnace is constantly maintained.

The thermal treatment is desirably conducted at a temperature in the range of 500 to 900° C. If the temperature of the thermal treatment is less than 500° C., the expanded graphite is subjected to incomplete thermal treatment, thus providing bad properties of the insulation panel according to the present invention. Contrarily, if the temperature of thermal treatment is greater than 900° C., energy consumption is increased to provide no economical saving.

The rise in the temperature of the thermal treatment is desirably conducted at a heating rate of 1 to 50° C./min. If the heating rate is too slow, the thermal treatment time is extended to lower the productivity thereof, but if the heating rate is too fast, thermal stress is applied due to drastic temperature rise. Accordingly, the temperature of the thermal treatment is desirably raised at the heating rate with the above-mentioned range.

Further, the thermal treatment is desirably conducted for 10 seconds to 12 hours. If the thermal treatment time is too long above 12 hours, energy consumption is increased to provide no economical saving and it is hard to further expect the thermal treatment effects. Contrarily, if the thermal treatment time is too short below 10 seconds, the expanded graphite is not expanded sufficiently due to the incomplete thermal treatment.

Further, the thermal treatment is desirably conducted at oxidizing atmosphere (for example, air or oxygen atmosphere).

After the thermal treatment, the temperature of the furnace is lowered to unload the thermally treated expanded graphite from the furnace. The furnace is cooled naturally through the cutoff of the power thereof, or a given temperature descending rate (for example, 10° C./min) is set to make the furnace cool. Even during the temperature of the furnace is lowered, desirably, the internal pressure of the furnace is constantly maintained.

The binder having one or more materials selected from the group consisting of polyvinyl alcohol, polyethylene glycol, and methyl cellulose, the thermally treated expanded graphite, and the swelling clays are mixed with each other, as starting materials, to form a composition for the sound-absorbing and fire-resistant insulation panel. The thermally treated expanded graphite is desirably present in an amount of from 10 to 100 parts by weight per 100 parts by weight of the swelling clays. One or more materials selected from the group consisting of polyvinyl alcohol, polyethylene glycol, and methyl cellulose is present in an amount of from 30 to 200 parts by weight per 100 parts by weight of the swelling clays and the thermally treated expanded graphite.

When the starting materials are mixed to form the composition for the sound-absorbing and fire-resistant insulation panel, one or more materials selected from the group consisting of water and ethanol are further added to the mixture, and one or more materials selected from the group consisting of water and ethanol are present in an amount of from 10 to 100 parts by weight per 100 parts by weight of the thermally treated expanded graphite and the swelling clays. Furthermore, when the starting materials are mixed to form the composition for the sound-absorbing and fire-resistant insulation panel, one or more materials selected from the group consisting of water glass from which alkali metal carbonates are removed and silica sol are further added to the mixture, and they are present in an amount of from 10 to 200 parts by weight per 100 parts by weight of the thermally treated expanded graphite and the swelling clays. If one or more materials selected from the group consisting of water glass from which alkali metal carbonates are removed and silica sol are added, the flame retardancy of the expanded graphite can be improved to provide good flame retardancy properties for the insulation panel and further to prevent the expanded graphite from being oxidized to improve fire resistance and heat resistance. There are various methods for making water glass from which alkali metal carbonates are removed. For example, $SiO_2$ and $Na_{2C}O_3$ are mixed and melted with each other and then quenched to produce water glass. After that, the water glass is absorbed to resin to remove the alkali metal carbonates (e.g., Na). The silica sol means colloid in which minute particles of silica ($SiO_2$, $nH_{2O}$) are dispersed by water as a dispersion medium.

Next, the composition for the sound-absorbing and fire-resistant insulation panel is molded to form the lightweight sound-absorbing and fire-resistant insulation panel. The composition for the sound-absorbing and fire-resistant insulation panel, which includes one or more materials selected from the group consisting of polyvinyl alcohol, polyethylene glycol, and methyl cellulose, the expanded graphite, and the swelling clays, is injected into a mold to form the insulation panel to a desired shape. The molded body desirably has a shape of a panel having a thickness of 5 to 50 mm. The molding may be performed with a variety of ways. For example, the molded body may be formed to a shape of a flat panel, and the molding is performed through uniaxial pressing or biaxial pressing under a given pressure (for example, 1 to 10 tons) or through an extruder.

After that, the molded product is dried. The drying is desirably performed at a temperature of a boiling point of water or below, for example, at a temperature in the range of 40 to 100° C. If the temperature for drying is less than 40° C., drying is not sufficient, and contrarily, if the temperature for drying is greater than 100° C., costs of equipment required and energy consumption costs are excessively raised to cause the manufacturing costs of the insulation panel to be increased. During the drying, the silica sol is changed to silica gel and then to silica. During the drying, further, the water components are removed from the water glass from which alkali metal carbonates are removed, so that glass components remain.

The lightweight sound-absorbing and fire-resistant insulation panel according to the present invention has an NRC (Noise Reduction Coefficient) of more than 0.5, thus being applicable to various fields, and accordingly, the insulation panel according to the present invention can provide better conveniences in construction process when compared with the existing sound absorbing insulation panels made of concrete materials and glass fiber materials.

Further, the lightweight sound-absorbing and fire-resistant insulation panel according to the present invention is more lightweight than the existing sound absorbing insulation panels, thus reducing the loads of various kinds of structures.

Furthermore, the lightweight sound-absorbing and fire-resistant insulation panel according to the present invention has excellent flame retardant properties, thus providing more excellent stability in fires when compared with the existing sound absorbing insulation panels made of flammable materials like Styrofoam, timber and so on.

Hereinafter, various preferred embodiments of the present invention will be in detail described, and of course, the present invention is not restricted by the preferred embodiments.

First Embodiment

The thermal treatment was conducted at a temperature of 600° C. for 1 hour. The rise in the temperature of the thermal treatment was conducted at a heating rate of 50° C./min, and the thermal treatment was conducted at air atmosphere. After the thermal treatment, the temperature of the furnace was lowered naturally.

The swelling clays are manufactured by crushing clays to a shape of circles, swelling the distance between the layer as much as 20 times to 50 times by heating the clays to a temperature of about 400 to 600° C. to expand the clays, and crushing the expanded clays to particle sizes in the range of 50 to 200 μm. The swelling clays after the crushing, heating, expansion and crushing processes have the layered structure with the shape of honeycombs.

Polyvinyl alcohol as a binder, the thermally treated expanded graphite, and swelling clays, bentonite were mixed with each other, as starting materials, to form a composition for the lightweight sound-absorbing and fire-resistant insulation panel. The bentonite and the thermally treated expanded graphite were mixed at a weight ratio of 9:1, and 30 to 143 parts by weight of the polyvinyl alcohol per 100 parts by weight of the bentonite and the thermally treated expanded graphite was mixed.

The composition for the sound-absorbing and fire-resistant insulation panel was molded to form the sound-absorbing and fire-resistant insulation panel. The composition for the sound-absorbing and fire-resistant insulation panel, which included the polyvinyl alcohol, the thermally treated expanded graphite, and the bentonite, was injected into a mold and then subjected to uniaxial pressing under about 3 tons to form the insulation panel. The molded insulation panel was cut off to thicknesses 4 mm, 10 mm, and 15 mm.

The molded insulation panel was then dried to form the sound-absorbing and fire-resistant insulation panel having excellent lightweightness, fire resistance, sound absorption and insulation properties. The drying was performed at a temperature of 70° C. for 24 hours.

Figure 1B:
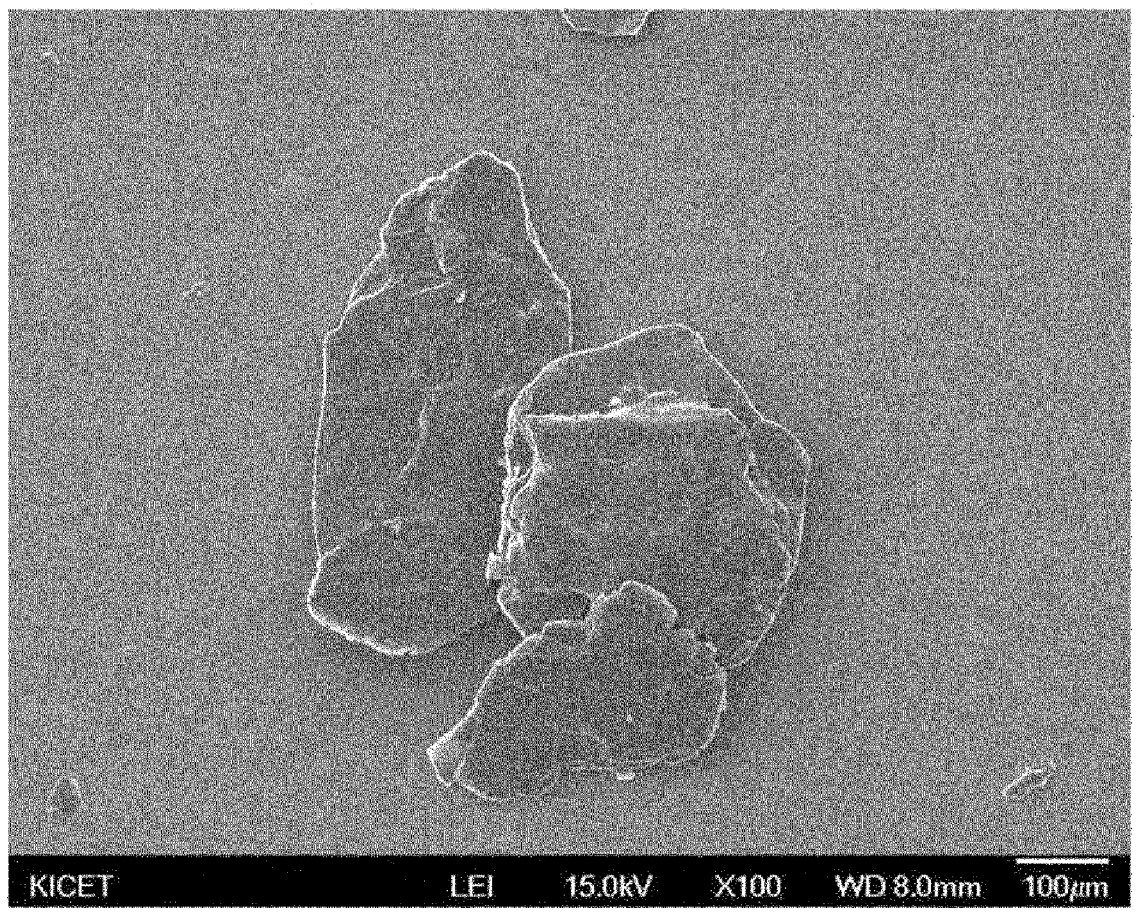
Figure 1C:
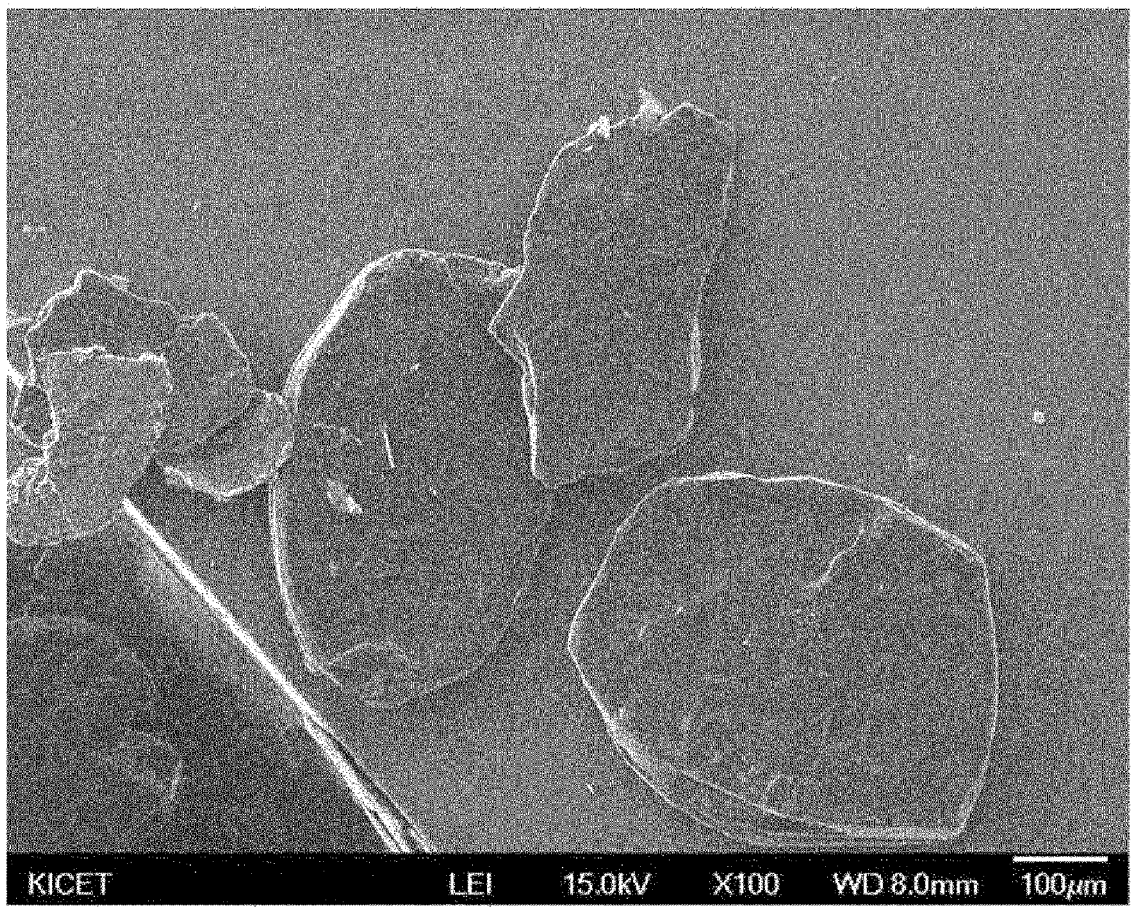
Figure 2A:
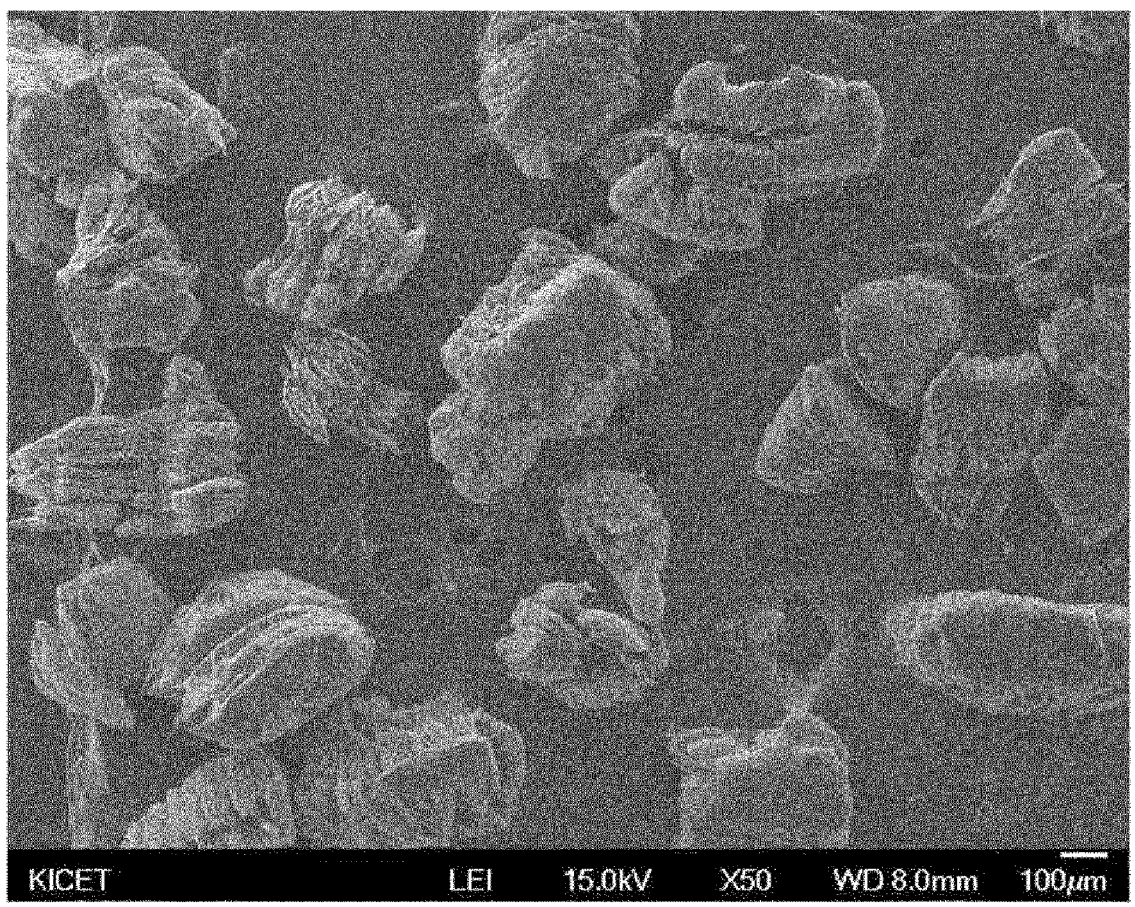
FIGS. 2a and 2c are photographs taken by the SEM showing the expanded graphite after the thermal treatment in a lightweight sound-absorbing and fire-resistant insulation panel according to the first embodiment of the present invention.
Figure 2C:
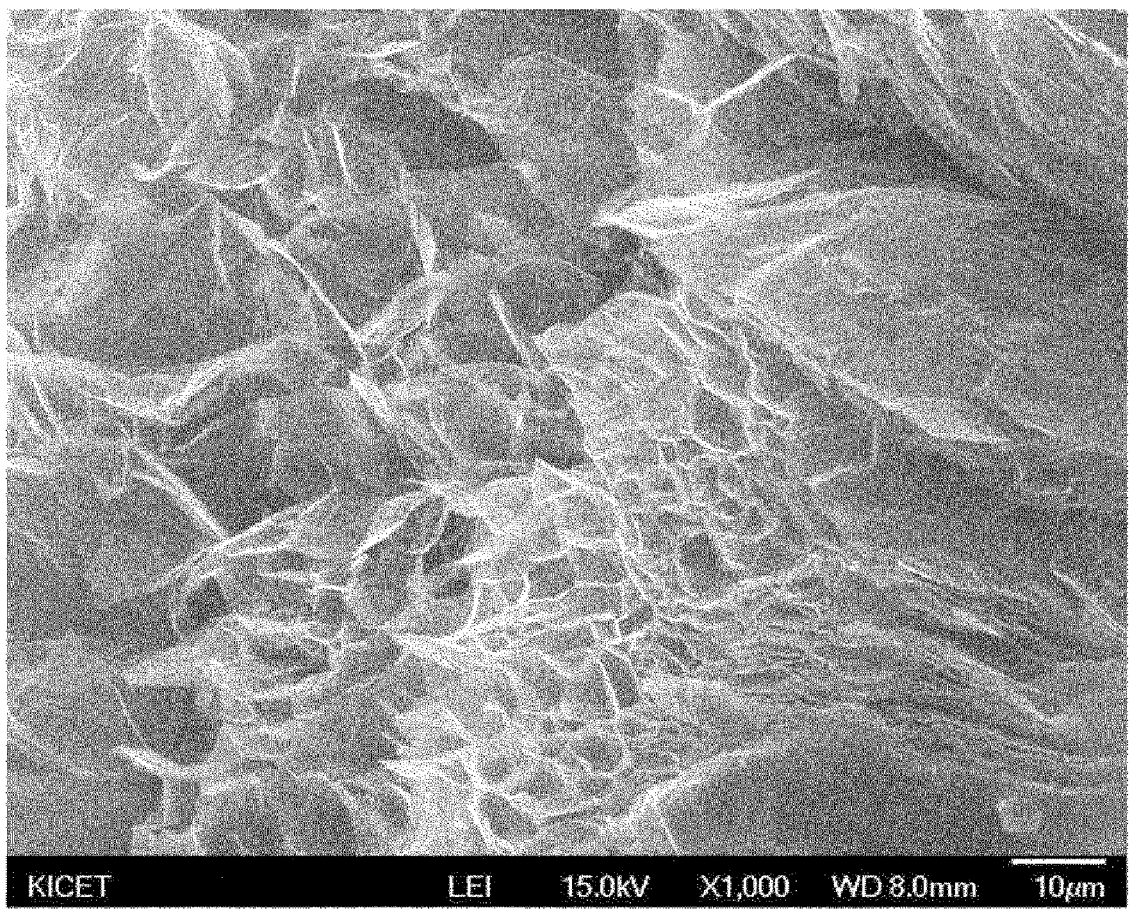
Figure 3:
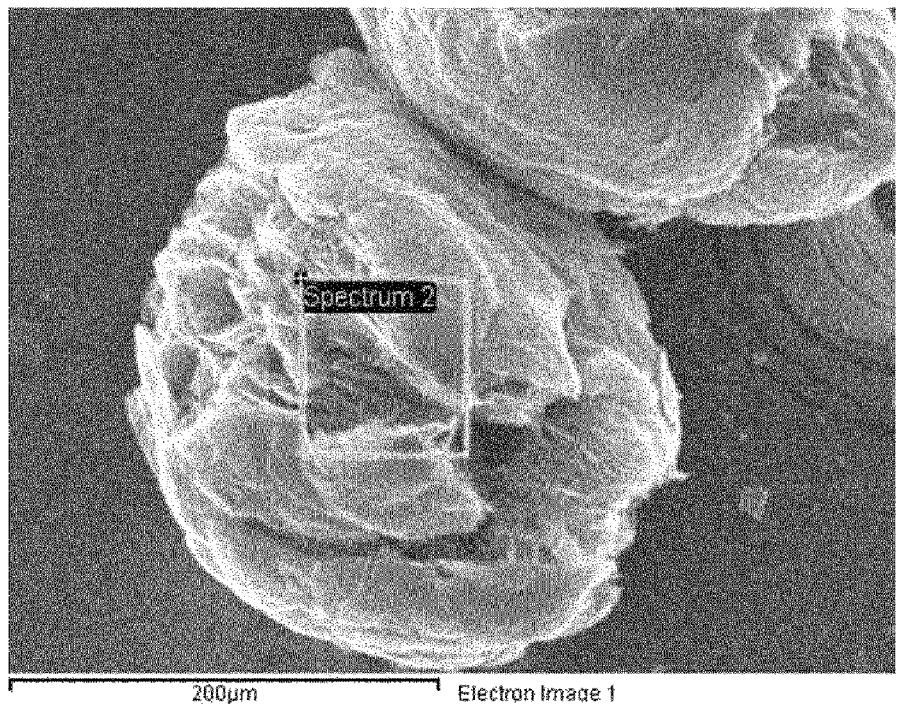
FIG. 3 is a table showing the analysis result of the elements of the expanded graphite after the thermal treatment according to the first embodiment of the present invention.

FIGS. 1a to 1c are photographs taken by a scanning electron microscope SEM showing the expanded graphite before the thermal treatment according to the first embodiment of the present invention, FIGS. 2a to 2c are photographs taken by the SEM showing the expanded graphite after the thermal treatment according to the first embodiment of the present invention, and FIG. 3 is a table showing the analysis result of the elements of the expanded graphite after the thermal treatment according to the first embodiment of the present invention.

Referring to FIGS. 1a to 3, it can be appreciated that the expanded graphite are expanded after the thermal treatment and contain carbon C as a main element and oxygen O, sulfur S and iron Fe as other elements. Since the sulfur element is contained in the expanded graphite, accordingly, it can be understood that sulfur compounds (for example, sulfur acids) are intercalated in the interlayers of the expanded graphite.

Figure 4A:
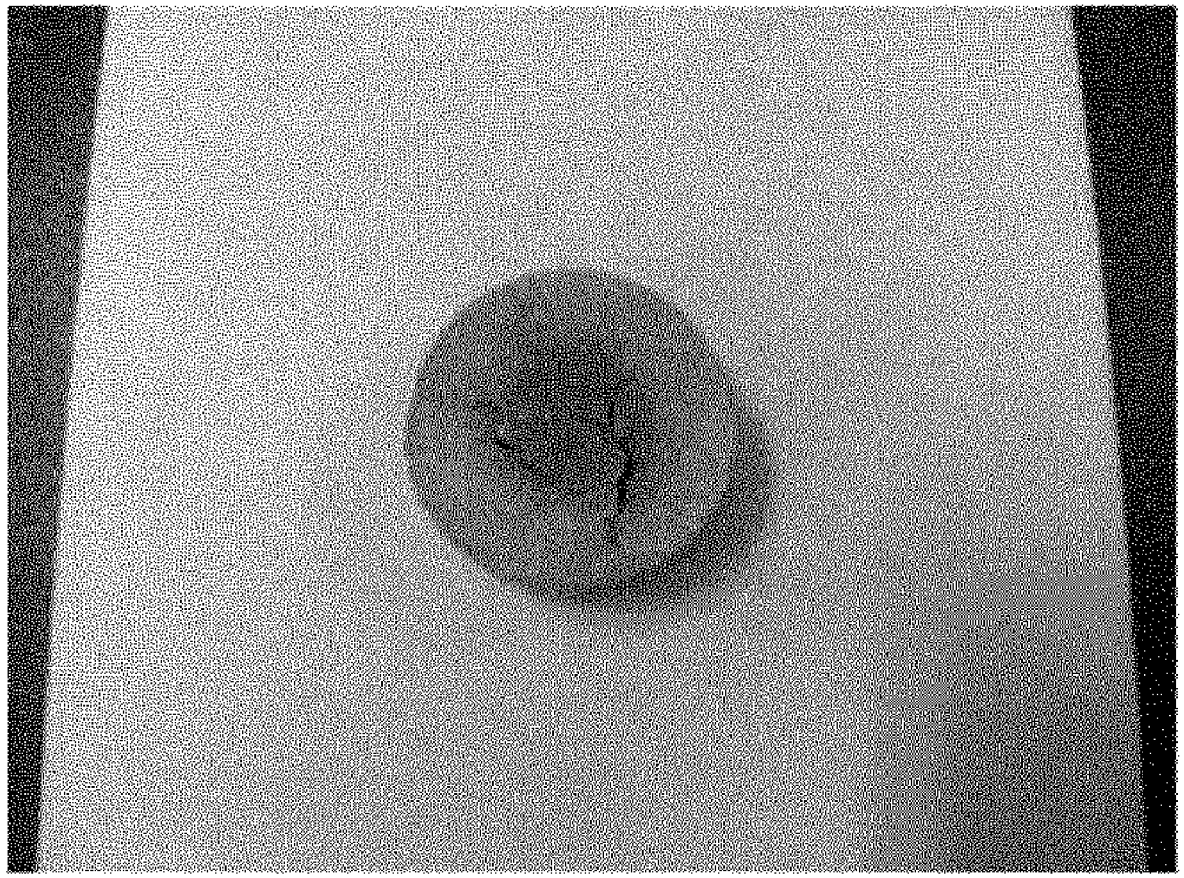
FIGS. 4a to 4e are photographs showing the lightweight sound-absorbing and fire-resistant insulation panel according to the first embodiment of the present invention.
Figure 4B:
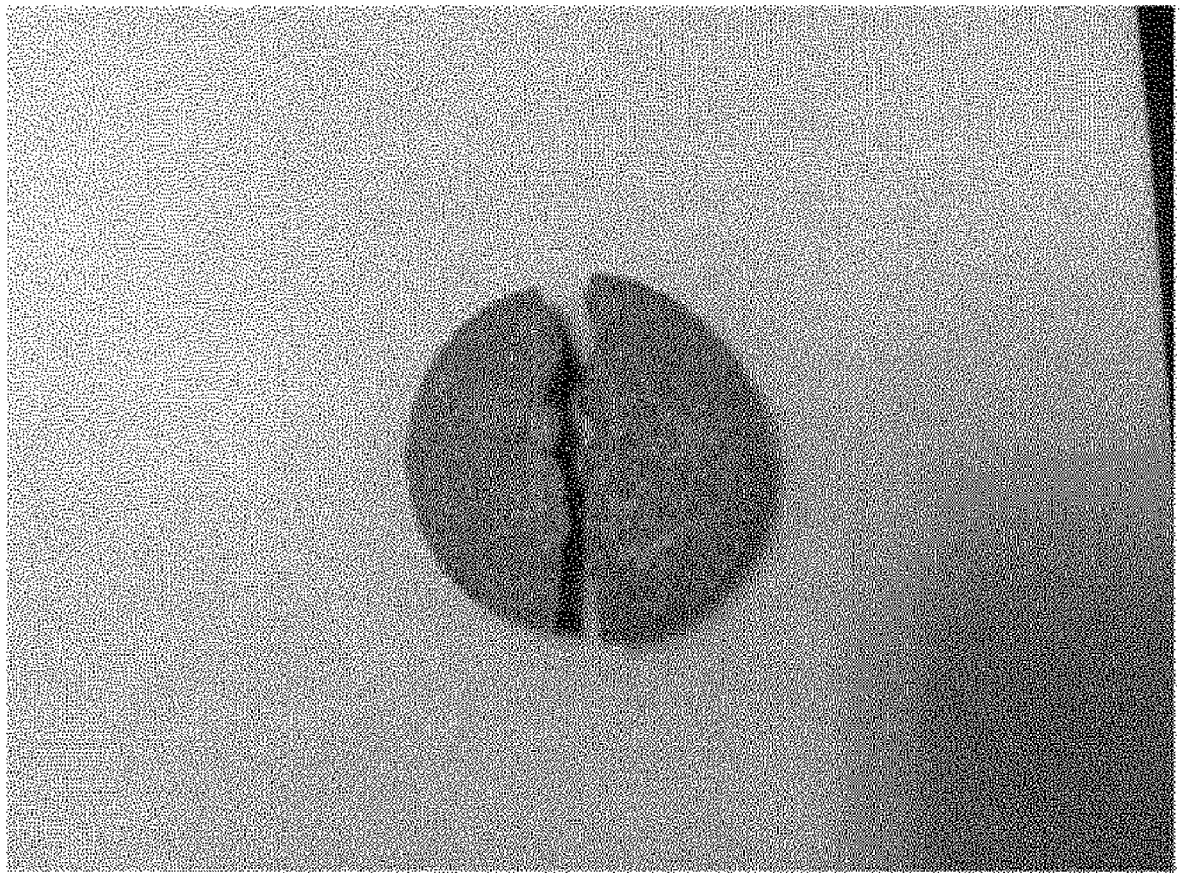
Figure 4C:
Figure 4D:
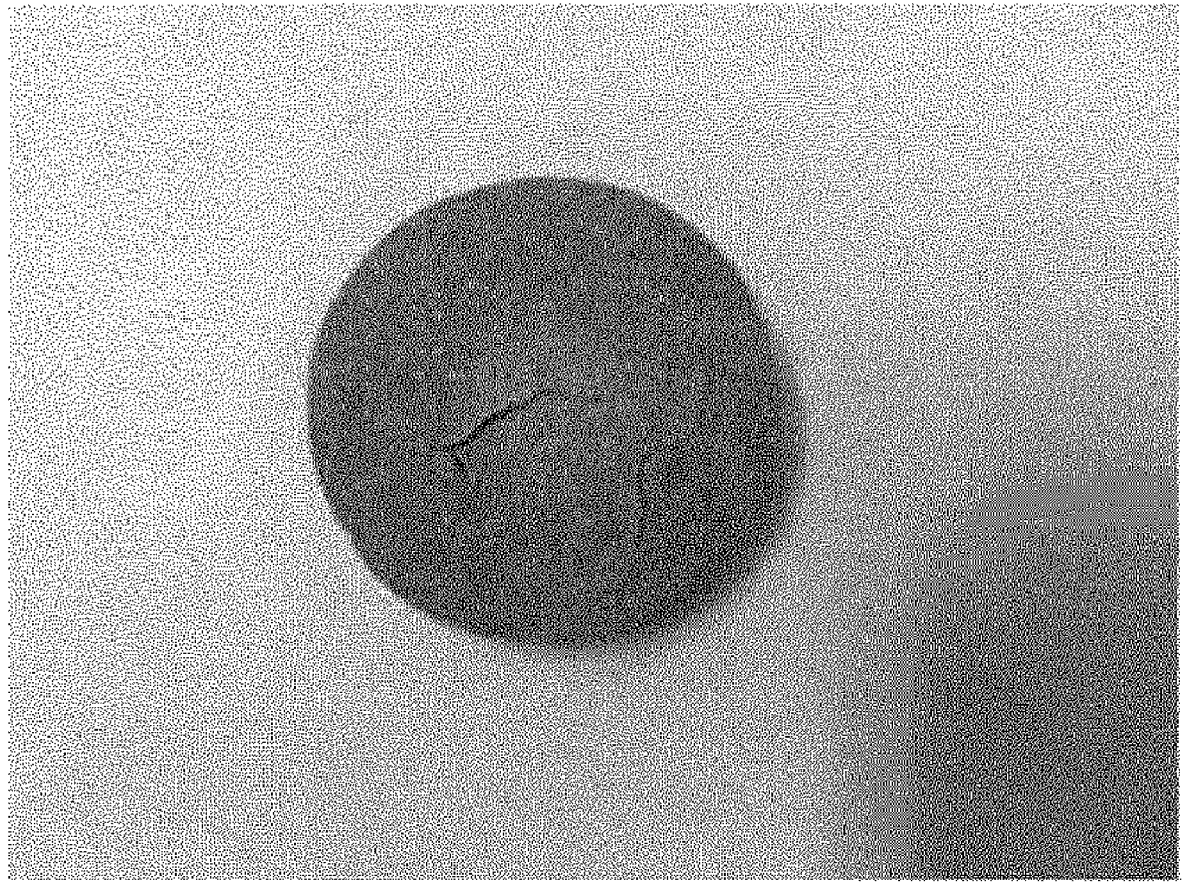
Figure 4E:

FIGS. 4a to 4e are photographs showing the lightweight sound-absorbing and fire-resistant insulation panel according to the first embodiment of the present invention. FIG. 4a shows the insulation panel comprising 143 parts by weight of the polyvinyl alcohol per 100 parts by weight of the bentonite and the thermally treated expanded graphite, while having a thickness of 15 mm, and FIG. 4b shows the insulation panel comprising 84 parts by weight of the polyvinyl alcohol per 100 parts by weight of the bentonite and the thermally treated expanded graphite, while having a thickness of 4 mm. Further, FIG. 4c shows the insulation panel comprising 88 parts by weight of the polyvinyl alcohol per 100 parts by weight of the bentonite and the thermally treated expanded graphite, while having a thickness of 4 mm, and FIG. 4d shows the insulation panel comprising 54 parts by weight of the polyvinyl alcohol per 100 parts by weight of the bentonite and the thermally treated expanded graphite, while having a thickness of 10 mm. Furthermore, FIG. 4e shows the insulation panel comprising 71 parts by weight of the polyvinyl alcohol per 100 parts by weight of the bentonite and the thermally treated expanded graphite, while having a thickness of 10 mm.

Referring to FIGS. 4a to 4e, if the insulation panel has the thickness of 4 mm, cracking occurs, and if the insulation panel has the thickness of more than 10 mm, partial cracking occurs.

Figure 5A:
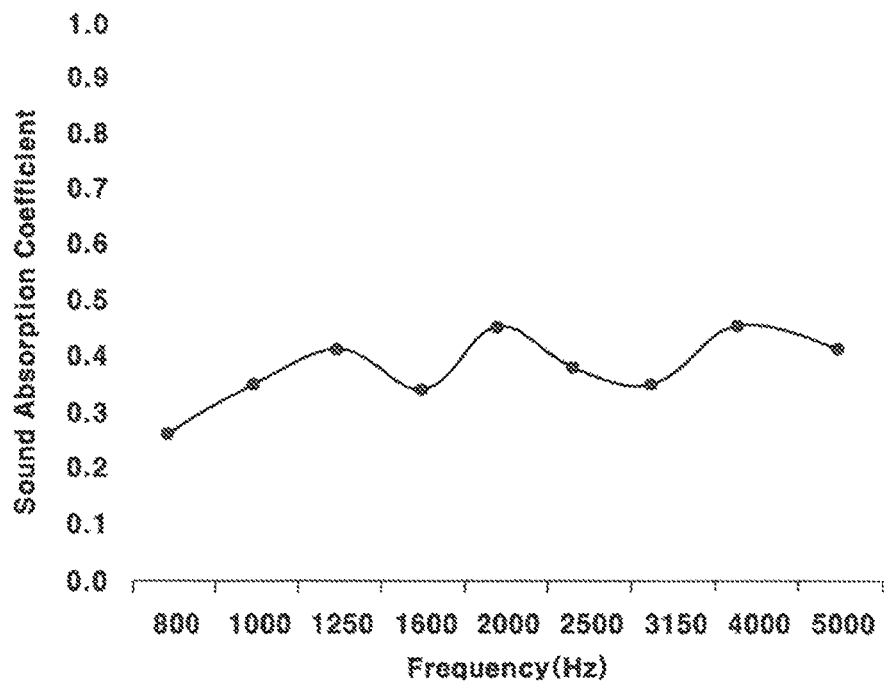
FIGS. 5a and 5b are graphs showing the sound absorption test data of the lightweight sound-absorbing and fire-resistant insulation panel according to the first embodiment of the present invention.
Figure 5B:
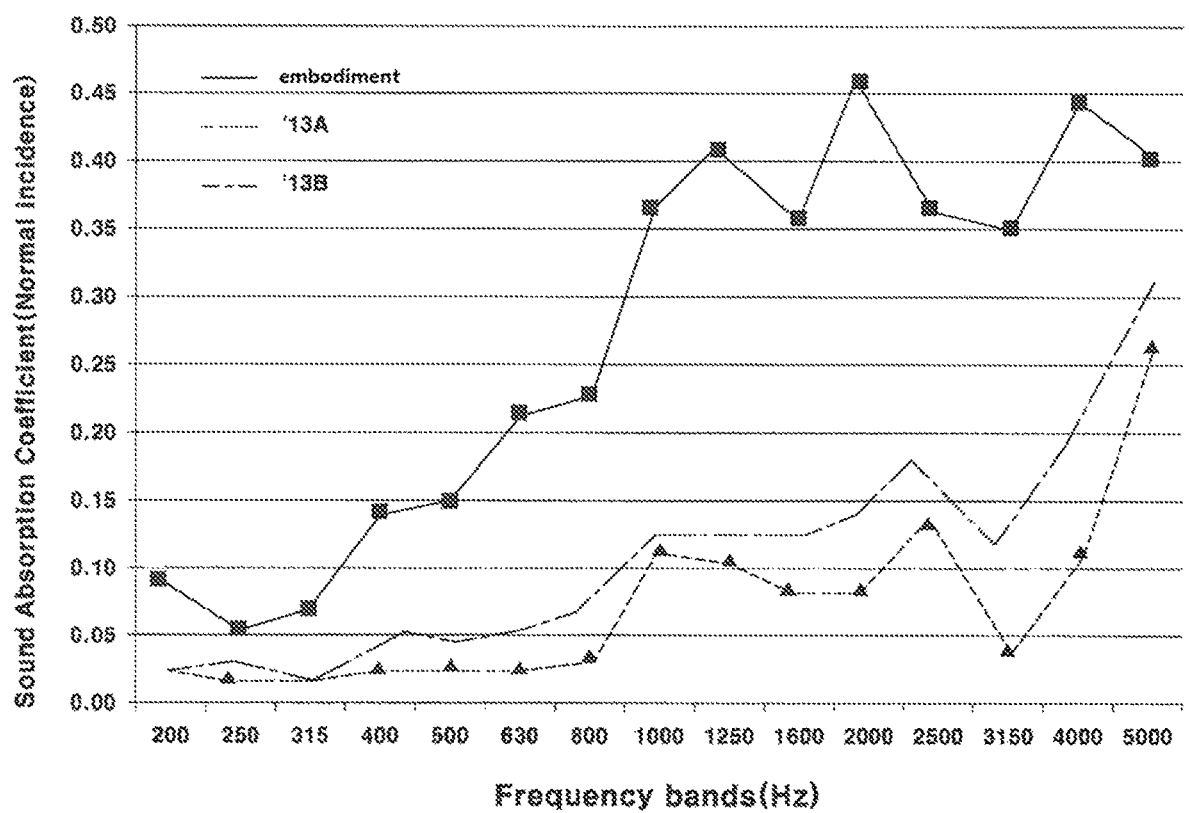

FIGS. 5a and 5b are graphs showing the test data of the sound absorption effects at high frequencies of the sound-absorbing and fire-resistant insulation panel according to the present invention. It can be appreciated that the sound absorption effects of the sound-absorbing and fire-resistant insulation panel according to the first embodiment of the present invention are substantially excellent.

Second Embodiment

The expanded graphite is manufactured by the first embodiment.

Bentonites, which are swelling clays, are manufactured via a method as the first embodiment.

Polyvinyl alcohol(binder), the thermally treated expanded graphite, and swelling clays, bentonite(swelling clays) were mixed with each other, as starting materials, to form a composition for the sound-absorbing and fire-resistant insulation panel. The bentonite and the thermally treated expanded graphite were mixed at weight ratios of 8:2 and 7:3, and 71 parts by weight of the polyvinyl alcohol per 100 parts by weight of the bentonite and the thermally treated expanded graphite was mixed.

The composition for the sound-absorbing and fire-resistant insulation panel was molded to form the sound-absorbing and fire-resistant insulation panel. The composition for the sound-absorbing and fire-resistant insulation panel, which included the polyvinyl alcohol, the thermally treated expanded graphite, and the bentonite, was injected into a mold and then subjected to uniaxial pressing under about 3 tons to form the insulation panel. The molded insulation panel was cut off to a thickness of 10 mm. The molded insulation panel was then dried to form the sound-absorbing and fire-resistant insulation panel having excellent lightweightness, fire resistance, sound absorption and insulation properties. The drying was performed at a temperature of 70° C. for 24 hours. The sound-absorbing and fire-resistant insulation panel according to the second embodiment of the present invention did not have any crack and further had very excellent sound absorption properties.

Third Embodiment

The expanded graphite and bentonites, which are swelling clays, are manufactured via a method as the first embodiment.

Polyvinyl alcohol(binder), the thermally treated expanded graphite, bentonite as swelling clays, and silica sol were mixed with each other, as starting materials, to form a composition for the sound-absorbing and fire-resistant insulation panel. The bentonite and the thermally treated expanded graphite were mixed at weight ratio of 7:3, and 71 parts by weight of the polyvinyl alcohol per 100 parts by weight of the bentonite and the thermally treated expanded graphite was mixed. Further, 100 parts by weight of the silica sol per 100 parts by weight of the bentonite and the thermally treated expanded graphite was mixed.

The composition for the sound-absorbing and fire-resistant insulation panel was molded to form the sound-absorbing and fire-resistant insulation panel. The composition for the sound-absorbing and fire-resistant insulation panel, which included the polyvinyl alcohol, the thermally treated expanded graphite, the bentonite, and the silica sol, was injected into a mold and then subjected to biaxial pressing under about 4.5 tons to form the insulation panel. The insulation panel was cut off to a thickness of 10 mm.

The molded insulation panel was then dried to form the lightweight sound-absorbing and fire-resistant insulation panel. The drying was performed at a temperature of 70° C. for 24 hours.

The sound-absorbing and fire-resistant insulation panel according to the third embodiment of the present invention did not have any crack and further had very excellent sound absorption properties.

Fourth Embodiment

The expanded graphite and bentonites, which are swelling clays, are manufactured via a method as the first embodiment.

Polyvinyl alcohol, the thermally treated expanded graphite, bentonite as swelling clays, and water were mixed with each other, as starting materials, to form a composition for the sound-absorbing and fire-resistant insulation panel. The bentonite and the thermally treated expanded graphite were mixed at weight ratio of 5:5, and 38 parts by weight of the polyvinyl alcohol and 63 parts by weight of the polyvinyl alcohol per 100 parts by weight of the bentonite and the thermally treated expanded graphite were mixed. Further, 75 parts by weight of the water per 100 parts by weight of the bentonite and the thermally treated expanded graphite was mixed.

The composition for the sound-absorbing and fire-resistant insulation panel was molded to form the sound-absorbing and fire-resistant insulation panel. The composition for the sound-absorbing and fire-resistant insulation panel, which included the polyvinyl alcohol, the thermally treated expanded graphite, the bentonite, and the water, was injected into a mold and then subjected to uniaxial pressing under about 5 tons to form the insulation panel. The insulation panel was cut off to a thickness of 10 mm.

The molded insulation panel was then dried to form the lightweight sound-absorbing and fire-resistant insulation panel. The drying was performed at a temperature of 70° C. for 24 hours.

The sound-absorbing and fire-resistant insulation panel according to the fourth embodiment of the present invention had small particles sticking to each other like clays and further had more excellent strength and sound absorption properties than the sound-absorbing and fire-resistant insulation panels according to the first to third embodiments of the present invention.

Fifth Embodiment

The expanded graphite and bentonites, which are swelling clays, are manufactured by the first embodiment.

Polyvinyl alcohol, the thermally treated expanded graphite, bentonite as swelling clays, and ethanol were mixed with each other, as starting materials, to form a composition for the sound-absorbing and fire-resistant insulation panel. The bentonite and the thermally treated expanded graphite were mixed at weight ratio of 5:5, and 38 parts by weight of the polyvinyl alcohol and 63 parts by weight of the polyvinyl alcohol per 100 parts by weight of the bentonite and the thermally treated expanded graphite were mixed. Further, 75 parts by weight of the ethanol per 100 parts by weight of the bentonite and the thermally treated expanded graphite was mixed.

The composition for the sound-absorbing and fire-resistant insulation panel was molded to form the sound-absorbing and fire-resistant insulation panel. The composition for the sound-absorbing and fire-resistant insulation panel, which included the polyvinyl alcohol, the thermally treated expanded graphite, the bentonite, and the ethanol, was injected into a mold and then subjected to uniaxial pressing under about 5 tons to form the insulation panel. The insulation panel was cut off to a thickness of 10 mm. The molded insulation panel was then dried to form the lightweight sound-absorbing and fire-resistant insulation panel. The drying was performed at a temperature of 70° C. for 24 hours.

The sound-absorbing and fire-resistant insulation panel according to the fifth embodiment of the present invention had excellent molding properties, but had lower strength than that according to the fourth embodiment of the present invention.

Sixth Embodiment

The expanded graphite and bentonites, which are swelling clays, are manufactured via a method as the first embodiment.

Polyvinyl alcohol, the thermally treated expanded graphite, bentonite as swelling clays, and silica sol were mixed with each other, as starting materials, to form a composition for the sound-absorbing and fire-resistant insulation panel. The bentonite and the thermally treated expanded graphite were mixed at weight ratio of 5:5, and 38 parts by weight of the polyvinyl alcohol per 100 parts by weight of the bentonite and the thermally treated expanded graphite was mixed. Further, 75 parts by weight of the silica sol per 100 parts by weight of the bentonite and the thermally treated expanded graphite was mixed.

The composition for the sound-absorbing and fire-resistant insulation panel was molded to form the sound-absorbing and fire-resistant insulation panel. The composition for the sound-absorbing and fire-resistant insulation panel, which included the polyvinyl alcohol, the thermally treated expanded graphite, the bentonite, and the silica sol, was injected into a mold and then subjected to uniaxial pressing under about 5 tons to form the insulation panel. The insulation panel was cut off to a thickness of 10 mm.

The molded insulation panel was then dried to form the lightweight sound-absorbing and fire-resistant insulation panel. The drying was performed at a temperature of 70° C. for 24 hours.

The sound-absorbing and fire-resistant insulation panel according to the sixth embodiment of the present invention had worse molding properties than that according to the fifth embodiment of the present invention, but had higher strength than that according to the fifth embodiment of the present invention.

Seventh Embodiment

The expanded graphite and bentonites, which are swelling clays, are manufactured via a method as the first embodiment.

Polyvinyl alcohol, the thermally treated expanded graphite, bentonite as swelling clays, water, ethanol, and silica sol were mixed with each other, as starting materials, to form a composition for the sound-absorbing and fire-resistant insulation panel. The bentonite and the thermally treated expanded graphite were mixed at weight ratio of 5:5, and 63 parts by weight of the polyvinyl alcohol per 100 parts by weight of the bentonite and the thermally treated expanded graphite was mixed. Further, 38 parts by weight of the water per 100 parts by weight of the bentonite and the thermally treated expanded graphite was mixed, 50 parts by weight of the ethanol per 100 parts by weight of the bentonite and the thermally treated expanded graphite was mixed, and 75 parts by weight of the silica sol per 100 parts by weight of the bentonite and the thermally treated expanded graphite was mixed.

The composition for the sound-absorbing and fire-resistant insulation panel was molded to form the sound-absorbing and fire-resistant insulation panel.

The composition for the sound-absorbing and fire-resistant insulation panel, which included the polyvinyl alcohol, the thermally treated expanded graphite, the bentonite, the water, the ethanol, and the silica sol, was injected into a mold and then subjected to uniaxial pressing under about 5 tons to form the insulation panel. The insulation panel was cut off to a thickness of 10 mm.

The molded insulation panel was then dried to form the lightweight sound-absorbing and fire-resistant insulation panel. The drying was performed at a temperature of 70° C. for 24 hours.

The sound-absorbing and fire-resistant insulation panel according to the seventh embodiment of the present invention had excellent molding properties, and had higher strength than that according to the fifth embodiment of the present invention.

Eighth Embodiment

The expanded graphite and bentonites, which are swelling clays, are manufactured via a method as the first embodiment.

Polyvinyl alcohol, the thermally treated expanded graphite, bentonite as swelling clays, water, and silica sol were mixed with each other, as starting materials, to form a composition for the sound-absorbing and fire-resistant insulation panel. The bentonite and the thermally treated expanded graphite were mixed at weight ratio of 5:5, and 50 parts by weight of the polyvinyl alcohol per 100 parts by weight of the bentonite and the thermally treated expanded graphite was mixed. Further, 30 parts by weight of the water per 100 parts by weight of the bentonite and the thermally treated expanded graphite was mixed, and 30 parts by weight of the silica sol per 100 parts by weight of the bentonite and the thermally treated expanded graphite was mixed.

The composition for the sound-absorbing and fire-resistant insulation panel was molded to form the sound-absorbing and fire-resistant insulation panel. The composition for the sound-absorbing and fire-resistant insulation panel, which included the polyvinyl alcohol, the thermally treated expanded graphite, the bentonite, the water, and the silica sol, was injected into a mold and then subjected to uniaxial pressing under about 6 tons to form the insulation panel. The insulation panel was cut off to a thickness of 10 mm.

The molded insulation panel was then dried to form the lightweight sound-absorbing and fire-resistant insulation panel. The drying was performed at a temperature of 70° C. for 24 hours.

The sound-absorbing and fire-resistant insulation panel according to the eighth embodiment of the present invention had excellent molding properties.

Ninth Embodiment

The expanded graphite and bentonites, which are swelling clays, are manufactured via a method as the first embodiment.

Polyvinyl alcohol, the thermally treated expanded graphite, bentonite as swelling clays, water, and silica sol were mixed with each other, as starting materials, to form a composition for the sound-absorbing and fire-resistant insulation panel. The bentonite and the thermally treated expanded graphite were mixed at weight ratio of 5:5, and 50 parts by weight of the polyvinyl alcohol per 100 parts by weight of the bentonite and the thermally treated expanded graphite was mixed. Further, 10 parts by weight of the water per 100 parts by weight of the bentonite and the thermally treated expanded graphite was mixed, and 30 parts by weight of the silica sol per 100 parts by weight of the bentonite and the thermally treated expanded graphite was mixed.

The composition for the sound-absorbing and fire-resistant insulation panel was molded to form the sound-absorbing and fire-resistant insulation panel. The composition for the sound-absorbing and fire-resistant insulation panel, which included the polyvinyl alcohol, the thermally treated expanded graphite, the bentonite, the water, and the silica sol, was injected into a mold and then subjected to uniaxial pressing under about 6 tons to form the insulation panel. The insulation panel was cut off to a thickness of 10 mm.

The molded insulation panel was then dried to form the lightweight sound-absorbing and fire-resistant insulation panel. The drying was performed at a temperature of 70° C. for 24 hours.

The sound-absorbing and fire-resistant insulation panel according to the ninth embodiment of the present invention had excellent molding properties.

TEST EXAMPLE

The thermal conductivities and apparent densities of the lightweight sound-absorbing and fire-resistant insulation panels according to the first to ninth embodiments of the present invention were measured by means of methods as described below, and the measured results are listed in Table 1.

Thermal conductivities were measured with a heat flow meter (Netzsch HFM 436 Lambda) using a heat flow method (ASTM C 518).

The apparent densities were measured by KS M 6962 standard.

TABLE 1

| | Thermal conductivity (W/mK) | Apparent density (g/cm³) |
|---|---|---|
| First embodiment | 0.12 | 0.15 |
| Second embodiment | 0.2 | 0.4 |
| Third embodiment | 0.18 | 0.33 |
| Fourth embodiment | 0.1 | 0.27 |
| Fifth embodiment | 0.28 | 0.21 |
| Sixth embodiment | 0.3 | 0.15 |
| Seventh embodiment | 0.17 | 0.48 |
| Eighth embodiment | 0.24 | 0.35 |
| Ninth embodiment | 0.22 | 0.5 |

As appreciated from Table 1, the thermal conductivities of the lightweight sound-absorbing and fire-resistant insulation panels according to the first to ninth embodiments of the present invention are in the range of 0.1 to 0.3 W/mK, and the apparent densities thereof are in the range of 0.1 to 0.5 g/cm³, so that they have appropriate physical properties as the insulation panel.

Further, after the sound absorption coefficient of the lightweight sound-absorbing and fire-resistant insulation panel according to the first embodiment of the present invention is measured in the high frequency range of 800 to 5000 Hz, it is found that the sound absorption coefficient is in the range of 0.22 to 0.46, so that the insulation panel according to the present invention provides excellent sound absorption properties (See FIG. 5a).

An insulation panel 13A manufactured in the same conditions as the first embodiment of the present invention except that general graphite and swelling clays are used is compared with an insulation panel 13B manufactured in the same conditions as the first embodiment of the present invention except that expanded graphite and general clays are used to measure their sound absorption coefficients, so that it is found that the lightweight sound-absorbing and fire-resistant insulation panel according to the first embodiment of the present invention has the most excellent sound absorption properties (FIG. 5b).

The lightweight sound-absorbing and fire-resistant insulation panels manufactured according to the first to ninth embodiment have sound absorption properties (0.25~0.43) which are almost similar to the first embodiment in the same condition to FIG. 5a.

The lightweight sound-absorbing and fire-resistant insulation panels manufactured in the same conditions as the first to ninth embodiment using vermiculite instead of bentonite as swelling clays have the thermal conductivity and the apparent density in the range as shown in table 1, and have sound absorption properties (0.26~0.40) which are almost similar to the first embodiment in the same condition to FIG. 5a.

The lightweight sound-absorbing and fire-resistant insulation panels manufactured in the same conditions as the first to ninth embodiment using any one material selected from montmorillonite, chlorite, sepiolite, attapulgite, saponite, hectorite, beidellite, halloysite, sauconite, and nontronite instead of bentonite as swelling clays have the thermal conductivity and the apparent density in the range as shown in table 1, and have sound absorption properties (0.26~0.40) which are almost similar to the first embodiment in the same condition to FIG. 5a.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A method for manufacturing a lightweight sound-absorbing and fire-resistant insulation panel, the method comprising the steps of:
   manufacturing expanded graphite by second expanding through thermal treatment after first expanding of graphite by acid;
   manufacturing swelling clays by crushing clays to a circular shape, heating the clays at a temperature of about 400 to 600° C., expanding the distance between the layers of clays as much as 20 times to 50 times, and comminuting the expanded clays to have particle sizes in the range of 50 to 20 μm,
   mixing the expanded graphite with a binder and the swelling clays, said mixing comprising adding a flame-retardant composition comprising one or more materials selected from the group consisting of water glass having alkali metal carbonates removed therefrom and silica sol; and
   molding the mixed material to form the lightweight sound-absorbing and fire-resistant insulation panel,
   wherein the swelling clays are formed of honeycomb-shaped layered clays containing water molecules in interlayers.

2. The method according to claim 1, wherein the expanded graphite is present in an amount of from 10 to 100 parts by weight per 100 parts by weight of the swelling clays, and the binder is present in an amount of from 30 to 200 parts by weight per 100 parts by weight of the swelling clays and the expanded graphite.

3. The method according to claim 1, wherein the binder comprises one or more materials selected from the group consisting of polyvinyl alcohol, polyethylene glycol, and methyl cellulose.

4. The method according to claim 1, wherein the thermal conductivity of the sound-absorbing and fire-resistant insulation panel is in the range of 0.1 to 0.3 W/mK.

5. The method according to claim 1, wherein the apparent density of the sound-absorbing and fire-resistant insulation panel is in the range of 0.1 to 0.5 g/cm$^3$.

6. The method according to claim 1, further comprising the step of mixing 10 to 100 parts by weight of one or more materials selected from the group consisting of water and ethanol per 100 parts by weight of the expanded graphite and the swelling clays.

7. The method according to claim 1, wherein the swelling clays are the layered clays having water molecules and exchangeable cations disposed in interlayers.

8. The method according to claim 1, wherein the swelling clays are the layered clays having water molecules disposed in interlayers in such a manner as to be partially exchanged with organic material to form a clay-organic complex.

9. The method according to claim 1, wherein the swelling clays comprise one or more materials selected from the group consisting of bentonite, vermiculite, montmorillonite, chlorite, sepiolite, attapulgite, saponite, hectorite, beidellite, halloysite, sauconite, and nontronite.

10. A method for manufacturing a lightweight sound-absorbing and fire-resistant insulation panel, the method comprising the steps of:
   manufacturing expanded graphite by second expanding through thermal treatment after first expanding of graphite by acid;
   manufacturing swelling clays by crushing clays to a circular shape, heating the clays at a temperature of about 400 to 600° C., expanding the distance between the layers of clays as much as 20 times to 50 times, and comminuting the expanded clays to have particle sizes in the range of 50 to 20 μm; and
   mixing the expanded graphite with a binder and the swelling clays, said mixing comprising adding 10 to 200 parts by weight of a flame-retardant composition per 100 parts by weight of the expanded graphite and the swelling clays, the flame-retardant composition comprising one or more materials selected from the group consisting of water glass having alkali metal carbonates removed therefrom and silica sol; and
   molding the mixed material to form the lightweight sound-absorbing and fire-resistant insulation panel,
   wherein the swelling clays are formed of honeycomb-shaped layered clays containing water molecules in interlayers.

11. The method according to claim 10, further comprising the step of mixing 10 to 100 parts by weight of one or more materials selected from the group consisting of water and ethanol per 100 parts by weight of the expanded graphite and the swelling clays.

12. The method according to claim 10, wherein the swelling clays are the layered clays having water molecules and exchangeable cations disposed in interlayers.

13. The method according to claim 10, wherein the swelling clays are the layered clays having water molecules disposed in interlayers in such a manner as to be partially exchanged with organic material comprising the expanded graphite to form a clay-organic complex.

14. The method according to claim 10, wherein the swelling clays comprise one or more materials selected from the group consisting of bentonite, vermiculite, montmorillonite, chlorite, sepiolite, attapulgite, saponite, hectorite, beidellite, halloysite, sauconite, and nontronite.

15. The method according to claim 9, further comprising the step of mixing 10 to 100 parts by weight of one or more materials selected from the group consisting of water and ethanol per 100 parts by weight of the expanded graphite and the swelling clays, and subsequently drying the material after molding.

16. The method according to claim 9, wherein the swelling clays are the layered clays having water molecules and exchangeable cations disposed in interlayers.

17. The method according to claim 9, wherein the swelling clays are the layered clays having water molecules disposed in interlayers in such a manner as to be partially exchanged with organic material comprising the expanded graphite to form a clay-organic complex.

18. The method according to claim 9, wherein the swelling clays comprise one or more materials selected from the group consisting of bentonite, vermiculite, montmorillonite, chlorite, sepiolite, attapulgite, saponite, hectorite, beidellite, halloysite, sauconite, and nontronite.

* * * * *